(12) United States Patent
Adar et al.

(10) Patent No.: US 9,086,965 B2
(45) Date of Patent: Jul. 21, 2015

(54) PCI EXPRESS ERROR HANDLING AND RECOVERY ACTION CONTROLS

(75) Inventors: Etai Adar, Yokneam Ilit (IL); Ilya Granovsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 13/326,457

(22) Filed: Dec. 15, 2011

(65) Prior Publication Data

US 2013/0159764 A1  Jun. 20, 2013

(51) Int. Cl.
*G06F 11/00* (2006.01)
*G06F 11/07* (2006.01)

(52) U.S. Cl.
CPC ........ *G06F 11/0745* (2013.01); *G06F 11/0793* (2013.01)

(58) Field of Classification Search
CPC .............. G06F 11/1479; G06F 11/203; G06F 9/45504; G06F 13/387
USPC ................ 714/5.1, 5.11, 43, 44, 56
See application file for complete search history.

(56) References Cited

U.S. PATENT DOCUMENTS

| | | | | |
|---|---|---|---|---|
| 7,707,465 B2 * | 4/2010 | Boyd et al. | | 714/57 |
| 7,836,352 B2 * | 11/2010 | Sharma et al. | | 714/44 |
| 7,930,598 B2 * | 4/2011 | Boyd et al. | | 714/48 |
| 8,156,493 B2 * | 4/2012 | Ellis et al. | | 718/100 |
| 8,510,592 B1 * | 8/2013 | Chan | | 714/5.1 |
| 8,589,723 B2 * | 11/2013 | Kumar et al. | | 714/4.5 |
| 2006/0271718 A1 | 11/2006 | DiPlacido et al. | | |
| 2009/0292960 A1 | 11/2009 | Haraden et al. | | |
| 2010/0251014 A1 | 9/2010 | Yagi | | |
| 2013/0060987 A1 * | 3/2013 | Bolen et al. | | 710/316 |

* cited by examiner

*Primary Examiner* — Bryce Bonzo
*Assistant Examiner* — Elmira Mehrmanesh
(74) *Attorney, Agent, or Firm* — International IP Law Group

(57) ABSTRACT

An apparatus and method of PCIe error handling and recovery actions taken in the event of an error. An error reporting extension defines a set of commonly used actions that are taken by a device in response to the detection of an error. This minimizes the side effects of continued device operation following the occurrence of an error. The device's error handling capabilities are advertised and the system software specifies the desired device action to take upon occurrence of a particular error. The particular error handling action is defined uniquely for each PCIe function and error type, such that different errors trigger a different type of action, thereby affecting only specific device functions or the entire device, depending on the configuration. Error handling actions and control fields are placed in the extension portion of the PCI Express Advanced Error Reporting configuration space.

12 Claims, 4 Drawing Sheets

PCI EXPRESS ERROR HANDLING AND RECOVERY ACTION CONTROLS

FIELD OF THE INVENTION

The present invention relates to the field of data communications, and more particularly relates to an apparatus and method of PCIe error handling and recovery actions taken in the event of an error.

SUMMARY OF THE INVENTION

There is thus provided in accordance with the invention, a method of PCI Express (PCIe) error handling, said method comprising providing error handling capabilities whereby on occurrence of an error a corresponding action is taken, and advertising said error handling capabilities to one or more devices and configuring desired action to be taken upon occurrence of an error.

There is also provided in accordance with the invention, a method of PCI Express (PCIe) error handling, said method comprising providing error handling capabilities including a PCIe Advanced Error Reporting (AER) extension defining a set of actions to be taken by a device in the event of an error, and advertising said error handling capabilities to one or more devices and configuring desired action to be taken upon occurrence of an error.

There is further provided in accordance with the invention, a PCI Express error handler apparatus, comprising a functional configuration space for storing error handling capabilities whereby on occurrence of an error a corresponding action is taken, and means for advertising said error handling capabilities to one or more devices and configuring desired action to be taken upon occurrence of an error.

There is also provided in accordance with the invention, a PCI Express (PCIe) endpoint, comprising an error handler for providing error handling capabilities whereby on occurrence of an error a particular action is taken, and means for advertising said error handling capabilities to one or more devices and configuring desired action to be taken upon occurrence of an error.

BRIEF DESCRIPTION OF THE DRAWINGS

The invention is herein described, by way of example only, with reference to the accompanying drawings, wherein.

DETAILED DESCRIPTION OF THE INVENTION

Figure 1:
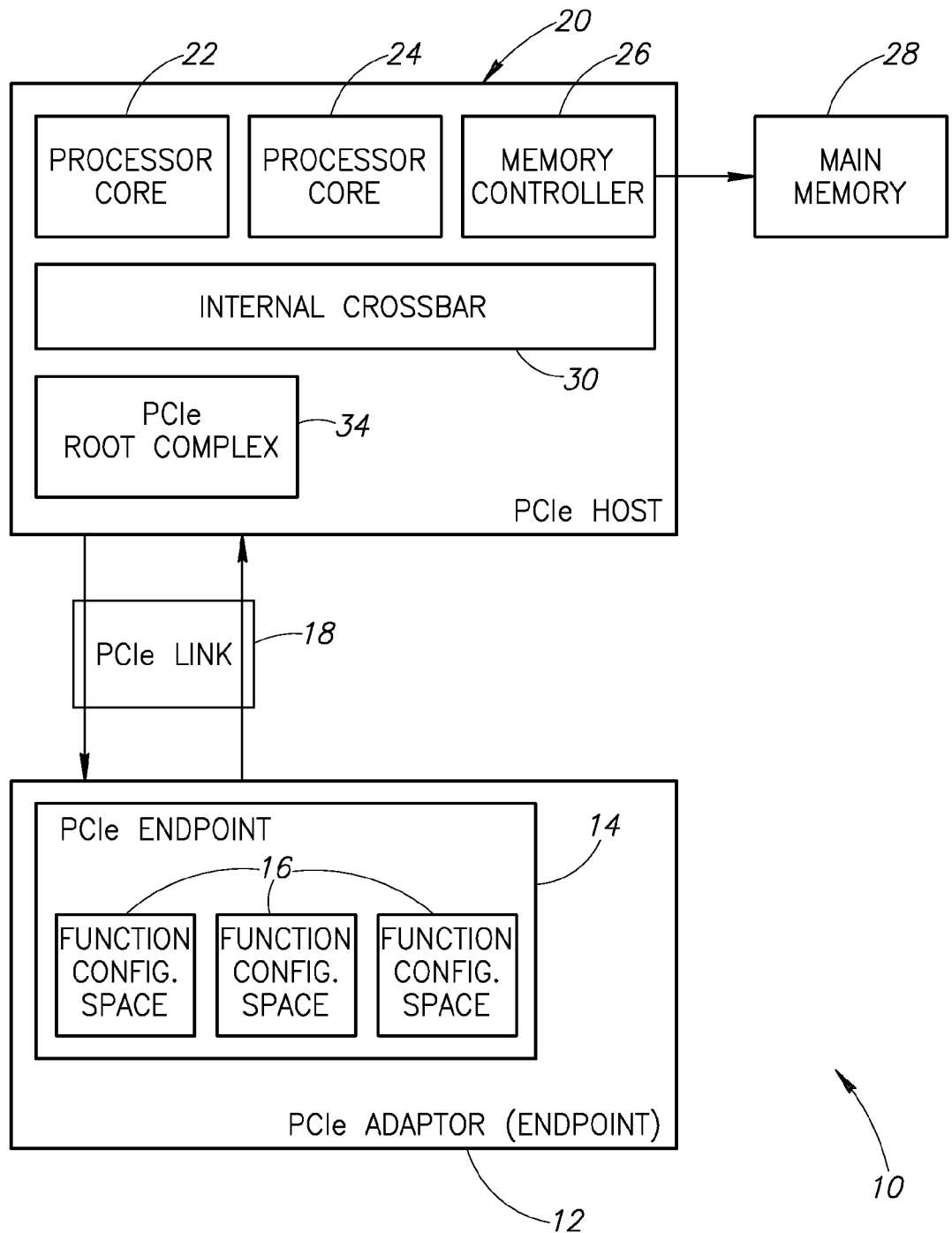
FIG. 1 is a block diagram illustrating an example PCIe network incorporating the PCIe error handling and recovery action mechanism of the present invention.

A block diagram illustrating an example PCIe network incorporating the PCIe error handling and recovery action mechanism of the present invention is shown in FIG. 1. The example network, generally referenced 10, comprises a PCIe host 20 and a PCIe adapter (or endpoint) 12 connected via PCIe link connection 18. The PCIe host 20 comprises one or more processor cores 22, 24, memory controller 26 coupled to main memory 28, internal crossbar 30 and PCIe root complex 34. The PCIe adapter 12 comprises PCIe endpoint block 14 which comprises one or more function configuration spaces 16.

The PCI Express (PCIe) standard has introduced extensive error logging and reporting capabilities in addition to base error capturing inherited from the conventional PCI standard. In particular, an Advanced Error Reporting (AER) configuration space capability has been introduced to provide a means for error capturing. Advanced Error Reporting capability allows error severity programming (i.e. Fatal/Non-Fatal), which indicates which error was logged first (i.e. the first error pointer). In addition, the AER capability implements header log registers that capture PCIe packet header information associated with the oldest reported error. This is achieved using separate AER registers: one for specifying error severity and the other for identifying the oldest error logged.

Currently, however, there is no standard set of actions defined that are taken upon the detection of an error. Therefore, PCIe devices continue normal operation until after the error is detected, even if application data integrity may have been compromised. This imposes an additional burden on system software (1) to distinguish between the original error and subsequently reported similar errors including those errors caused as a consequence of the original error; (2) to ensure that subsequent error recovery actions are taken and do not create additional problems; (3) to ensure that all side-effects of continued device operation have been removed/recovered from; and (4) to ensure the application state is restored to the last confirmed point of operation from where the application is then able to resume execution.

The PCIe error handling and recovery action mechanism of the present invention provides a solution to the above problems. In one embodiment, the PCIe error handling and recovery action mechanism comprises a PCIe Advanced Error Reporting (AER) extension that defines a set of commonly used actions that can be taken by a device in response to the detection of an error. Use of the error handling and recovery action mechanism minimizes the side effects of continued device operation following the occurrence of an error.

The PCIe error handling and recovery action mechanism is operative to advertise the device's error handling capabilities. In addition, system software specifies the desired device action upon occurrence of an error. The particular error handling action is defined uniquely for each PCIe function and error type, such that different errors trigger a different type of action, thereby affecting only specific device functions or the entire device, depending on the configuration. In one embodiment, the error handling actions and additional capabilities and control fields are placed in the extension portion of the PCI Express Advanced Error Reporting (AER) capability or in a new configuration space capability specifically defined for this purpose.

Figure 2:
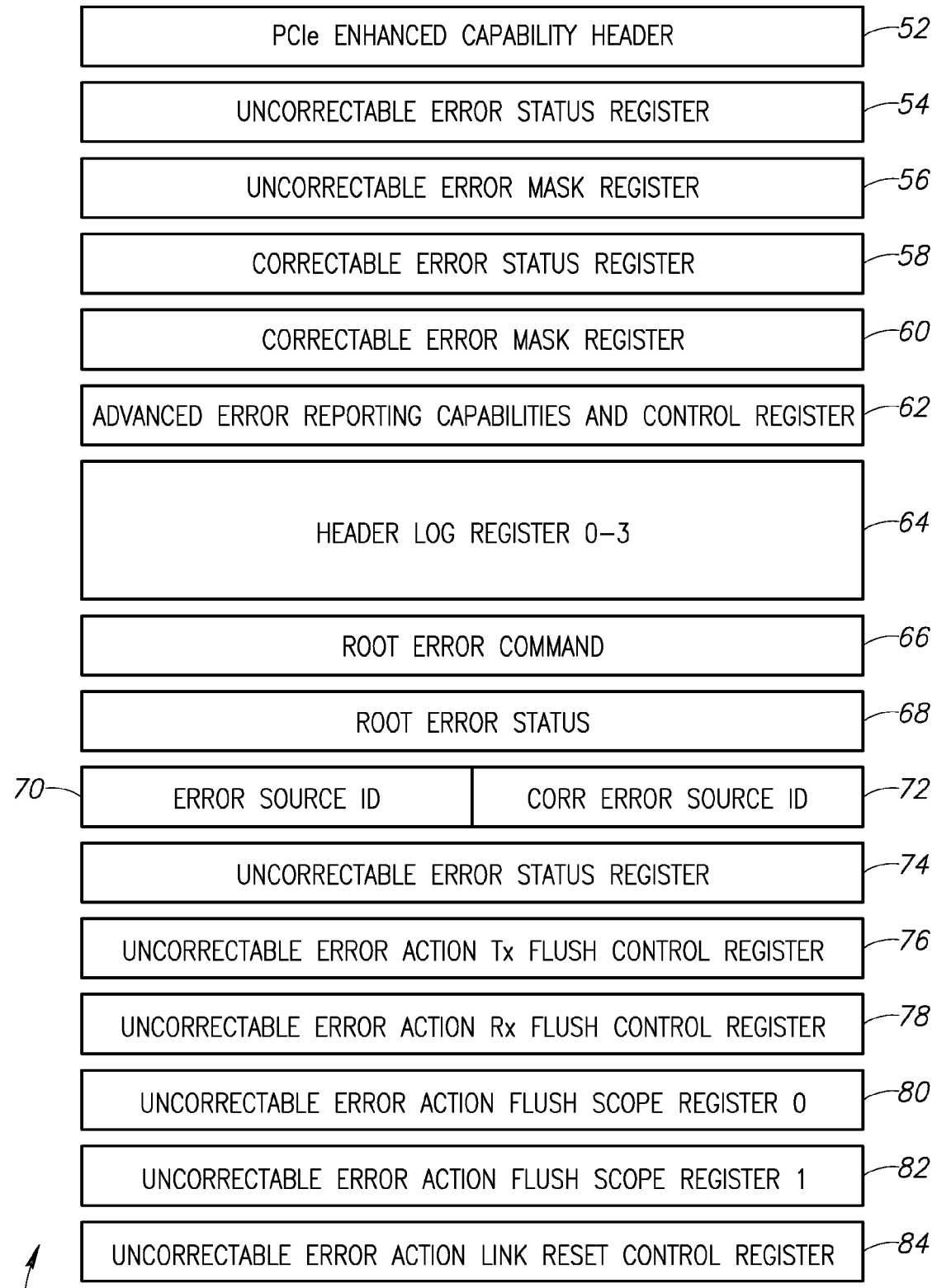
FIG. 2 is a diagram illustrating an example structure of the configuration space extension.

A diagram illustrating an example structure of the configuration space extension is shown in FIG. 2. The configuration space, generally referenced 50, comprises PCIe Enhanced Capability Header 52, Uncorrectable Error Status Register 54, Uncorrectable Error Mask Register 56, Correctable Error Status Register 58, Correctable Error Mask Register 60, Advanced Error Reporting Capabilities and Control Register 62, Header Log Register 0-3 64, Root Error Command 66, Root Error Status 68, Error Source ID 70, Correctable Error Source ID 72 and Uncorrectable Error Status Register 74. In addition, several action control registers utilized by the PCIe error handling and recovery action mechanism include Uncorrectable Error Action TX Flush Control Register 76, Uncorrectable Error Action RX Flush Control Register 78, Uncorrectable Error Flush Scope Register 0 80, Uncorrectable Error Flush Scope Register 1 82 and Uncorrectable Error Action Link Reset Control Register 84.

Note that the layout of the action control registers 76, 78 are similar to that of the Uncorrectable Error Status Register 74, wherein for each error in the status register there are corresponding control bits in action control registers. The TX flush control turns on the transmit flush procedure for the appropriate errors. Similarly, RX flush control turns on the receive flush procedure for the appropriate errors. Note that an error may have both TX and RX flushes turned on. The Flush Scope Registers 80, 82 determine which functions are affected by the flush. Several possibilities include (1) only the function associated with the error (default); (2) the entire device (scope 0 register bit is on); or (3) all virtual functions (VFs) of the affected physical resource (scope 1 register bit is turned on). The Link Reset Register 84 indicates that the PCIe link itself is to be reset.

In one embodiment, the device advertises to other devices its error handling capabilities for each error specified in the PCIe Advanced Error Reporting (AER) structure. System software programs/configures desired error handling action for each error case in accordance with the error handling capabilities advertised.

In an example embodiment, each error type can have the following action options: (1) no action (default); (2) flush TX memory transactions; (3) flush RX memory transactions; (4) flush both TX and RX memory transactions; and (5) perform a link reset.

Note that a transactions flush can be performed for different sets of functions, depending on the error type and potential scope of the damage. In a first case, a function-level flush is used for function-specific errors whereby only transactions associated only with the affected function are flushed. The function-level flush mode can apply to both Physical Functions (PFs) or Virtual Functions (VFs), in either single-root or multi-root virtualized devices.

In a second case, a partition-level flush is performed wherein all physical and virtual functions associated with the same partition in a virtualized device are placed in a flush state. Function association is determined through a Function Dependency Linked List, as specified by the SR-IOV Specification.

In a third case, a physical resource flush is performed wherein the physical function (PF) and all virtual copies of this function, i.e. virtual functions (VFs) are flushed.

In a fourth case, a virtual hierarchy level flush is performed wherein in multi-root virtualized devices, all physical function (PFs) and virtual functions (VFs) mapped to the affected Virtual Hierarchy are flushed.

In a fifth case, the entire device is flushed. In this case, all functions of the device (physical and virtual functions included) are flushed.

Note that in one embodiment, when a transaction flush is performed, all received memory transactions are silently dropped according to the following rules. First, received memory writes are discarded, any credits are released, and no error is reported. Second, received memory reads are discarded, any credits are released, no error is reported and no completion is sent. The application recovery routine is responsible for silently terminating and/or timing-out uncompleted transactions issued during the flush state. Third, memory writes submitted by the device for transmission are discarded and no error is reported. Fourth, memory reads submitted by device for transmission are terminated locally and no error is reported.

Figure 3:
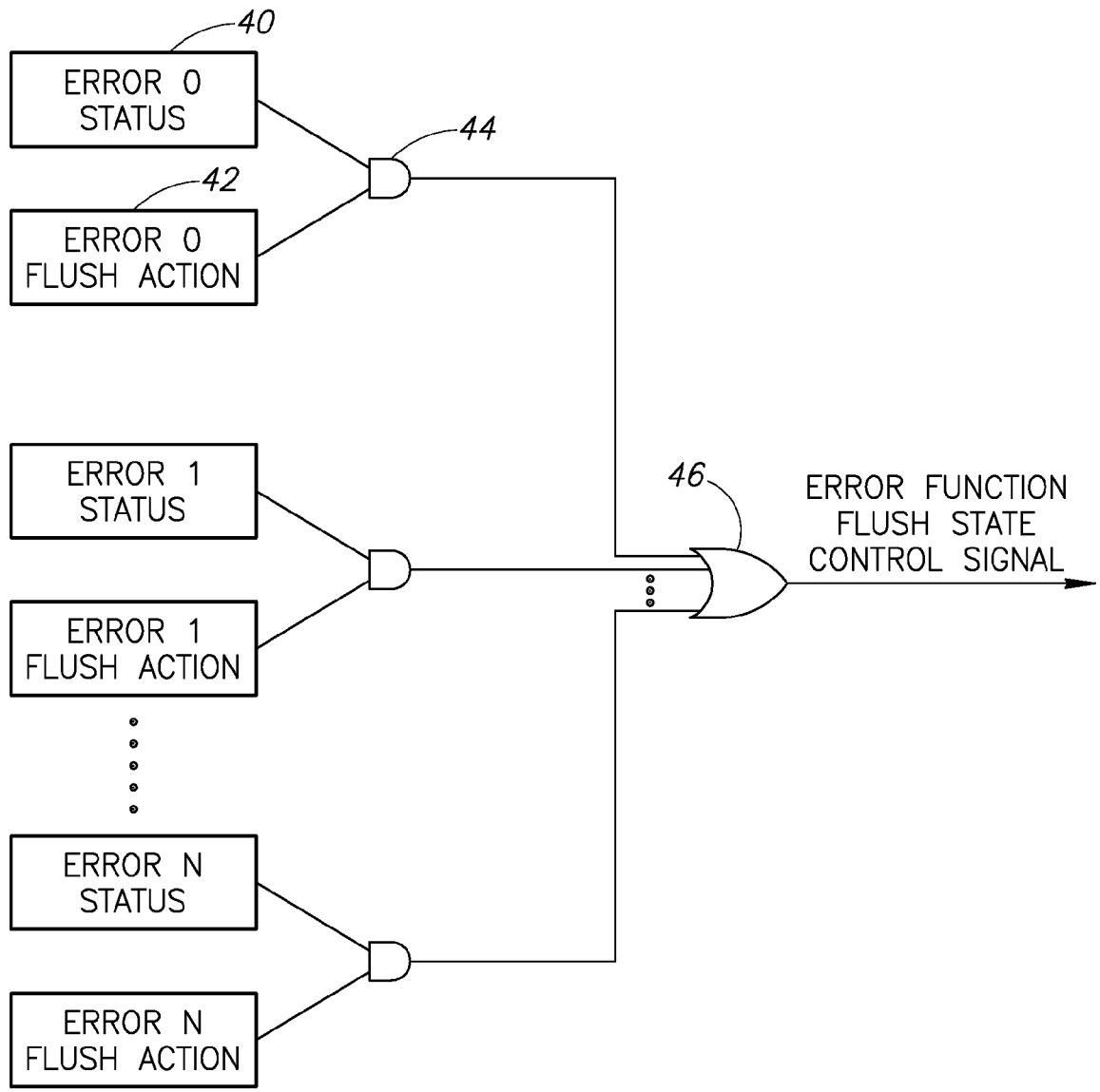
FIG. 3 is a diagram illustrating example generation of the error function flush state control signal in accordance with the PCIe error handling and recovery action mechanism of the present invention.
Figure 4:
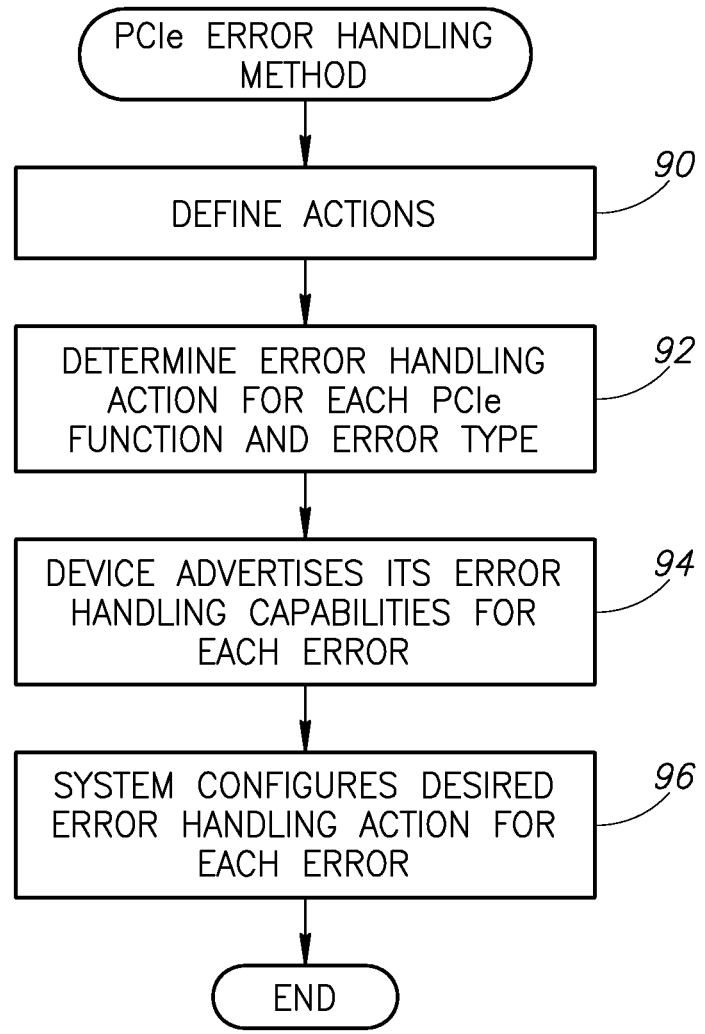
FIG. 4 is a flow diagram illustrating the PCIe error handling method of the present invention.

In one embodiment, whenever an error occurs, is detected and an error action specified for the error, the error action state is turned on. Flush-type error action states are cleared when a corresponding error bit is cleared in the configuration space. Note that flush states are cumulative and overlapping, i.e. in case of multiple errors, flush states triggered by different sources are combined. In this case, the device remains in the flush state until all appropriate error status bits are cleared. FIG. 3 illustrates an example flush state implementation approach. The error status 40 and error flush action 42 for each of N different actions are ANDed together via AND gates 44. The output of the N number of AND gates are ORed via OR gate 46 to generate the error function flush state control signal.

Note that preferably it should be ensured that the following capabilities remain unaffected by the different flush states: (1) the device configuration space access; and (2) interrupt generation and/or handling.

Note that in one embodiment, the address regions, i.e. base address registers (BARs), of specific functions can be specified. These address regions store control data (such as MSI-X tables, control registers, etc.) and preferably remain accessible in a flush state. Additionally, the device preferably ensures that MSI/MSI-X interrupts generated during the flush state that appear to be similar to regular memory writes, are not dropped and successfully delivered to the host.

To illustrate the principles of the mechanism of the present invention, the following error handling action usage examples can be considered. In a first example, consider the occurrence of an internal device error. Whenever the device detects an internal error (such as a data integrity error or a corrupted state) and the impact of this error can be isolated to a certain function, than this function can be placed in a flush state while other functions continue their normal operation. Application software, however, must re-initialize the affected function and resume execution of the application from the last known restorable state. If the internal error affected more than a single function, a wider scope of flush is applied, requiring a more extensive recovery. In either case, use of the mechanism allows the device to preserve some level of operation, despite the corruption, without the need to bring the entire device down.

In a second error handling action usage example, consider a Completer Abort error. This kind of error is identified by the temporary or permanent inability of the target device to provide a response to the received request. Following a Completer Abort error, application data flow may be corrupted and thus cannot be used any further, since the application must now perform a higher level recovery procedure. In this case, suspending or freezing application data flow helps to avoid secondary errors of the same or different type (which would otherwise further reduce the overall data flow), thereby freeing up bandwidth for other applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of PCI Express (PCIe) error handling, said method comprising:
    providing error handling capabilities whereby on occurrence of an error a corresponding action is taken; and
    advertising said error handling capabilities to one or more devices and configuring desired action to be taken upon occurrence of an error, the desired action comprising a link reset, not performing an action, a transmitter memory transaction flush, a receiver memory transaction flush, or the transmitter memory transaction flush and the receiver memory transaction flush, the transmitter memory transaction flush and the receiver memory transaction flush comprising flushing a physical function associated with the error, flushing a virtual function associated with the error, or flushing at least one physical function associated with the error and at least one virtual function associated with the error.

2. The method according to claim 1, wherein the transmitter memory transaction flush or the receiver memory transaction flush is related to a PCIe function in accordance with a particular error type and potential scope of damage.

3. The method according to claim 1, wherein the transmitter memory transaction flush comprises a full or partial transaction flush of a device in response to an error event.

4. A method of PCI Express (PCIe) error handling, said method comprising:
    providing error handling capabilities including a PCIe Advanced Error Reporting (AER) extension defining a set of actions to be taken by a device in the event of an error; and
    advertising said error handling capabilities to one or more devices and configuring desired action to be taken upon occurrence of an error, the desired action comprising a link reset, not performing an action, a transmitter memory transaction flush, a receiver memory transaction flush, or the transmitter memory transaction flush and the receiver memory transaction flush, the transmitter memory transaction flush and the receiver memory transaction flush comprising flushing a physical function associated with the error, flushing a virtual function associated with the error, or flushing at least one physical function associated with the error and at least one virtual function associated with the error.

5. The method according to claim 4, wherein said transmitter memory transaction flush or said receiver memory transaction flush comprises a transaction flush related to a PCIe function in accordance with a particular error type and potential scope of damage.

6. The method according to claim 4, wherein said transmitter memory transaction flush or said receiver memory transaction flush comprises a full or partial transaction flush of a device in response to an error event.

7. A PCI Express error handler apparatus, comprising:
    a functional configuration space for storing error handling capabilities whereby on occurrence of an error a corresponding action is taken; and
    means for advertising said error handling capabilities to one or more devices and configuring desired action to be taken upon occurrence of an error, the desired action comprising a link reset, not performing an action, a transmitter memory transaction flush, a receiver memory transaction flush, or the transmitter memory transaction flush and the receiver memory transaction flush, the transmitter memory transaction flush and the receiver memory transaction flush comprising flushing a physical function associated with the error, flushing a virtual function associated with the error, or flushing at least one physical function associated with the error and at least one virtual function associated with the error.

8. The apparatus according to claim 7, wherein said transmitter memory transaction flush or said receiver memory transaction flush comprises a transaction flush related to a PCIe function in accordance with a particular error type and potential scope of damage.

9. The apparatus according to claim 7, wherein said transmitter memory transaction flush or said receiver memory transaction flush comprises a full or partial transaction flush of a device in response to an error event.

10. A PCI Express (PCIe) endpoint, comprising:
    an error handler for providing error handling capabilities whereby on occurrence of an error a particular action is taken; and
    advertising said error handling capabilities to one or more devices and configuring desired action to be taken upon occurrence of an error, wherein said desired action comprises a link reset, not performing an action, a transmitter memory transaction flush, a receiver memory transaction flush, or the transmitter memory transaction flush and the receiver memory transaction flush, the transmitter memory transaction flush and the receiver memory transaction flush comprising flushing a physical function associated with the error, flushing a virtual function associated with the error, or flushing at least one physical function associated with the error and at least one virtual function associated with the error from the PCIe endpoint.

11. The method according to claim 10, wherein the transmitter memory transaction flush and the receiver memory transaction flush comprise a transaction flush related to a PCIe function in accordance with a particular error type and potential scope of damage.

12. The method according to claim 10, wherein the transmitter memory transaction flush and the receiver memory transaction flush comprise a full or partial transaction flush of a device in response to an error event.

* * * * *